United States Patent Office 3,479,398
Patented Nov. 18, 1969

3,479,398
NITROGEN OXIDE COMPOUNDS AS
SULFOXIDATION PROMOTERS
Howard W. Bost and Charles F. Cook, Bartlesville, Okla., assignors to Phillips Petroleum Company, a corporation of Delaware
No Drawing. Filed Dec. 30, 1965, Ser. No. 517,815
Int. Cl. C07c *143/02*
U.S. Cl. 260—513                                6 Claims

ABSTRACT OF THE DISCLOSURE

Organic compounds containing hydrocarbon linkages are sulfoxidized in the presence of a sulfoxidizing agent comprising sulfur dioxide and at least one reaction promoting compound selected from $HNO_3$, $NO_2$, $NO$, $N_2O_3$, and $N_2O_4$. Preferred products obtained from hydrocarbon reactants and conversion rates are accelerated where the sulfoxidizing agent contains molecular oxygen in addition to sulfur dioxide and wherein the reaction is initiated by the presence of known initiators such as ozone, peroxides, hydroperoxides and/or actinic radiation.

---

This invention relates to a process for sulfoxidizing organic materials and particularly for the preparation of sulfoxidized organic compounds through the reaction of organic feedstocks with a sulfoxidizing agent, a reaction initiator, and a sulfoxidation promoter.

In one aspects, the invention relates to a process for sulfoxidizing organic compounds to product sulfoxidized products by treating said organic compounds with a sulfoxidizing agent, a sulfoxidation initiators, and a compound selected from the group consisting of $HNO_3$, $NO_2$, $NO$, $N_2O_3$, and $N_2O_4$ as a promoting agent, or promoter.

In yet another aspect, the invention relates to a process for sulfoxidizing organic compounds by treating said organic compounds with a sulfoxidizing agent comprising a mixture of sulfur dioxide and oxygen, a reaction initiator such as actinic radiation, peroxides, hydroperoxides, and/or ozone, and a reaction promoter selected from the group consisting of $HNO_3$, $NO_2$, $NO$, $N_2O_3$, and $N_2O_4$.

Another aspect of this invention is the production of sulfoxidized hydrocarbon compounds through the treatment of hydrocarbon feedstocks with sulfur dioxide and oxygen, a sulfoxidation initiator, and a reaction promoter selected from the group consisting of $HNO_3$, $NO_2$, $NO$, $N_2O_3$, and $N_2O_4$.

The sulfoxidation of organic compounds has been extensively investigated, and it is known int he art that sulfoxidized hydrocarbon compounds can be obtained by treating hydrocarbon feedstocks with sulfur dioxide and oxygen in the presence of various reaction initiators such as ultraviolet light, peroxides, and ozone. However, the amounts of these initiators generally required to obtain substantial conversion in a reaction of economically feasible holding time are considerable. The intensity of the actinic radiation required to obtain substantial conversion in sulfoxidation processes initiated by ultraviolet light is generally quite high, and further, in such processes, contacting problems are prominent due to the physical nature of the initiator. Further, the yields from ozone initiated sulfoxidation reactions are not sufficiently high to warrant ready acceptance of such process for commercial use.

It is therefore an object of this invention to provide a new promoter for sulfoxidation processes. It is a further object of this invention to provide an improved process for the sulfoxidation of saturated hydrocarbons in the presence of sulfur dioxide, oxygen, and an ozone initiator. It is yet another object of this invention to provide an improved process for the sulfoxidation of straight chain saturated hydrocarbons to produce the corresponding sulfonic acids.

Other aspects, objects and advantages of this invention will be apparent and readily obvious to one skilled in the art from the following disclosure and the appended claims.

In accordance with this invention, the rate of sulfoxidation of organic compounds is greatly improved by carrying out the reaction in the presence of a reaction promoting compound selected from the group consisting of $HNO_3$, $NO_2$, $NO$, $N_2O_3$ and $N_2O_4$.

Further in accordance with the process of this invention, the rate of sulfoxidation of organic compounds particularly saturated hydrocarbon compounds in the presence of a sulfoxidizing agent and in the presence or absence of a sulfoxidation initiating agent is greatly improved by adding to the reaction mixture a compound selected from the group consisting of $HNO_3$, $NO_2$, $NO$, $N_2O_3$, and $N_2O_4$, as a reaction promoter.

More specifically in accordance with this invention, the sulfoxidation of a mixture of organic compounds comprising primarily saturated hydrocarbon compounds in the presence of sulfur dioxide and oxygen, and a reaction initiating agent such as ozone, peroxides, hydroperoxides, and/or actinic radiation is substantially improved through the use of at least one promoting agent selected from the group consisting of $HNO_3$, $NO_2$, $NO$, $N_2O_3$, and $N_2O_4$.

The organic compounds employed as feedstocks in the process of this invention can contain functional groups that do not substantially inhibit the promoting action of the promoters of this invention. It is only necessary that these feedstocks contain saturated hydrocarbon linkages that are not substantially impaired by adjacent functional groups. Although not intended to be limiting, the preferred feedstocks of the process of this invention are saturated hydrocarbon compounds containing up to about twenty-four carbon atoms per molecule which may comprise cyclic structures. Although the process of this invention is applicable to the sulfoxidation of both branched and straight chain saturated hydrocarbons, it is preferred to utilize the straight chain hydrocarbons, particularly those having from about 12 to about 15 carbon atoms, as the sulfonic acids which are produced therefrom have highly desirable surface active characteristics and, as a result, find substantial utility in the production of detergents. A further advantage to the utilization of the straight chain saturated hydrocarbon compounds as feedstocks for this process is that the product sulfonic acids are not only effective wetting agents, but are also biodegradable.

Some examples of alkanes which can be sulfoxidized by the process of this invention are:

methane
ethane
butane
isobutane
n-hexane
isooctane
n-decane
n-dodecane
n-pentadecane
n-hexadecane (cetane)
n-tetraeicosane
cyclohexane
cyclodecane
decahydronaphthalene
n-eicosane The process of this invention can be carried out at a temperature generally ranging from 0–75° C., preferably below 50° C. and still more preferably between 15 and 30° C. The color of the produced sulfonic acids is improved by operation at lower temperatures, but at their lower temperatures the rate of sulfoxidation decreases significantly, and significant amounts of peroxide appear in the product. However, the process of the present invention can be operated at significantly lower temperatures than the processes of the prior art without reducing the conversion rate below an economically feasible level. Consequently, the process of this invention in permitting lower operating temperatures provides a product comprising sulfonic acids of improved color and purity characteristics at commercially feasible conversion rates.

In the preferred embodiment of this process, the mol ratio of $SO_2/O_2$ should be at least 1/1, but it is preferred to utilize an excess of $SO_2$. Thus, the mol ratios of $SO_2/O_2$ can range as high as 3.0/1, but it is preferred to operate at about 1.1/1.0. The reaction is conveniently carried out by charging the hydrocarbon to be sulfoxidized to the sulfoxidation reactor along with the catalyst to be employed. $SO_2$, oxygen and ozone are then passed into the reactor in the desired amount, utilizing a sufficiently high feed rate of $SO_2$ so as to maintain the desired concentration of dissolved $SO_2$ in the hydrocarbon. The $SO_2$, oxygen and ozone can be passed to the reactor in single streams or in a mixed stream, or in any combination of mixed streams. It is most convenient to pass the oxygen stream through an ozonator so as to form the desired amount of ozone and then pass this mixture of ozone and oxygen directly into the reactor, either per se or in admixture with the $SO_2$. In one method of operation, the formed sulfonic acids separate out at the bottom of the sulfoxidation reactor. This material can be drawn off continuously or intermittently as desired. The reaction can also be carried out in a continuous operation and the sulfonic acids recovered by conventional means after removal of the reaction mixture from the reaction zone. The amount of ozone in the oxygen-ozone mixture can range from about 0.5 weight percent to about 10 weight percent, and if they are supplied in separate streams, the relative amount employed will be within the same range.

The amount of promoter employed according to the invention can vary over a wide range. Generally, the promoter chosen will be present in the reaction zone in an amount ranging from 0.001 to 5 weight percent based on the hydrocarbon in the sulfoxidation reactor, preferably from 0.05 to 2 weight percent on the same basis. As another important feature of this inventon, many of the promoters of the invention are normally gaseous materials and can be passed into the reaction zone in admixture with the $SO_2$ or oxygen or both, thus eliminating the need for separate charge tubes for the promoter. This allows one to make use of the sparger already provided for the other gaseous materials entering the reactor.

As described above the process can also be carried out in the presence or absence of a reaction initiator such as ultraviolet light, peroxides, hydroperoxides, and/or ozone. Generally speaking, any wave length of light within the ultraviolet range can be utilized although it is preferred to employ actinic radiation having a wave length of from about 2000 to 3600 angstroms. The peroxide, hydroperoxide, and/or ozone can be added to the reaction zone along with the oxygen stream and need be present only in amounts sufficient to initiate the sulfoxidation reaction. However, an added advantage is achieved through the presence of larger amounts of these initiators, particularly, ozone, in that they serve to reduce the color of the final product, especially when present in the upper portion of the above-specified range.

As another advantage of this process, it was described above that lower temperatures lead to sulfonic acids of improved color. In some instances, when operating in the preferred temperature range, the produced sulfonic acids are colored to some extent ranging from a light yellow to black. The use of ozone as the reaction initiator has the dual benefit of effecting some decolorizing of this material. It is also within the scope of this invention to further treat the produced sulfonic acids with ozone after removal of the sulfonic acids from the sulfoxidation reactor.

The sulfonic acids which are produced by the process of this invention can be converted to the corresponding alkali metal or ammonium salts and utilized directly as wetting agents, emulsifiers and detergents.

The following specific example contains a series of runs which clearly show the advantage of employing the promoters of this invention. However, it is not intended that the invention be limited to the specific features shown in this example.

EXAMPLE I

A series of runs was carried out in which n-dodecane was converted to dodecanesulfonic acid by sulfoxidation with $SO_2$ and oxygen in the presence of ozone and in the presence or absence of various promoters of the invention.

In these runs, 2700 ml. of n-dodecane was charged to a 3 liter reactor vessel which comprised a glass reaction having an enlarged bottom of approximately 1 liter capacity and a 4 inch diameter upper section having approximately a 2 liter capacity. Two fritted sparge tubes were mounted just above the enlarged section with $SO_2$ feeding one frit and an oxygen-ozone mixture feeding the other frit. The reaction was carried out by passing .04 cubic foot per minute of oxygen containing 65–75 milligrams of ozone per liter in the one frit and simultaneously passing .044 cubic foot per minute of $SO_2$ into the other frit. The reaction was continued for several hours to obtain a base level for productivity of dodecanesulfonic acid in grams per hour. Product dodecanesulfonic acid was drawn off intermittently from the bottom of the reactor and makeup dodecane was added to maintain the dodecane level in the reactor at 2500–2700 ml. By measurement of the amount of dodecanesulfonic acid drawn off, the productivity level was determined. When this productivity level had stabilized, the promoter was charged to the reactor. The run was continued, and the productivity level was again determined over a several hour period. The results of these runs are shown in the table.

TABLE

| Promoter | Amt. of promoter (as indicated) | Baseline productivity rate, grams per hour | Temperature during baseline determination, °C. | Time to maximize productivity rate after promoter addition, mins. | Max. temp. after promoter addition, °C. | Max. prod. rate, grams per hour |
|---|---|---|---|---|---|---|
| $HNO_3$ | 5 grams (conc.) | 115 | 21 | 106 | 37 | 420 |
| $HNO_3$ | 1 ml. (conc.) | 116 | 21 | 85 | 37 | 388 |
| $HNO_3$ | 0.5 ml. | (¹) | 18 | 6 | 47 | 388 |
| $NO_2$ | 2 ml. $N_2O_4$ in 25 ml. dodecane | 118 | 21 | 81 | 31 | 471 |
| NO | Gaseous NO bubbled in for 3 mins. with $SO_2$ off, then NO off, $SO_2$ on. | 119 | 15 | 112 | 38 | 508 |
| $N_2O_3$ | Gaseous $N_2O_3$ bubbled in for 3 mins. with $SO_2$ off, then $N_2O_3$ off, $SO_2$ on. | 101 | 12 | 163 | 31 | 552 |

¹ Additional promoter added after rate preceding run dropped to 225 g./hr. (47 min.).

A comparison of the baseline productivity rates achieved under conventional sulfoxidation conditions in the absence of the promoter of this invention with the maximum productivity rate achieved through the addition of small amounts of these promoters as shown in the table readily illustrates the considerable advantage by way of increased conversion rate that is obtained in the process of this invention. In way of the particular illustration of the comparisons illustrated in the table the productivity rate of the second base line run of 116 grams per hour was increased at a maximum to 388 grams per hour by the addition of one milliliter of concentrated nitric acid.

Although the process of this invention is illustrated as a batch-type operation in the foregoing example, the concept of the present invention is readily adaptable to continuous sulfoxidation operations. In such operations the promoter can be added continuously to the reaction zone in a stream separate from other reactants and with or without diluent or it may be introduced into the reaction zone along with the feed to be sulfoxidized. Similarly, the sulfoxidized product can be continuously removed from the reaction zone and either purified or processed in any desired manner.

Any or all of the feed streams to the sulfoxidation zone can comprise in part an inert diluent such as carbon dioxide or nitrogen in the gaseous feed streams and the amount of such diluent can be varied to provide an additional means of controlling and modifying sulfoxidation conditions and concentration of reactants in the sulfoxidation zone. Further, the concentration of the sulfoxidizing agent, particularly the mixture of sulfur dioxide and oxygen, as well as the concentration of ozone initiator and promoter, can be modified by varying the pressure in the reaction zone. In this respect, it is within the concept of this invention to operate at any feasible pressure that will provide the desired concentration of volatile reactants.

Reasonable variation and modification are possible within the scope of the foregoing disclosure and the appended claims to the invention, the essence of which is that there is provided a process for the sulfoxidation of organic compounds, preferably saturated hydrocarbon materials, in the presence of a sulfoxidizing agent such as a mixture of sulfur dioxide and oxygen, and further in the presence of a sulfoxidation initiator, particularly ozone, and a promoting amount of a promoter selected from the group consisting of $HNO_3$, $NO_2$, $NO$, $N_2O_3$, and $N_2O_4$.

We claim:
1. A process for sulfoxidizing organic materials containing saturated hydrocarbon linkages which comprises reacting hydrocarbons selected from alkanes and cycloalkanes containing from 1–24 carbon atoms per molecule with a sulfoxidizing agent comprising sulfur dioxide and oxygen and a sulfoxidation initiator comprising at least one of peroxides, hydroperoxides, ozone, and actinic radiation in the presence of a promoting amount of at least one of $HNO_3$, $NO_2$, $NO$, $N_2O_3$, and $N_2O_4$.

2. The method of claim 1 wherein the concentration of said promoter is from about 0.001 to about 5 weight percent based on said hydrocarbon, and said contacting is conducted at a temperature within the range of from about 0 to about 75° C.

3. The method of claim 1 wherein the ratio of said sulfur dioxide to said oxygen is within the range of from about 1 to about 3, and said hydrocarbon is an open chain hydrocarbon.

4. The method of claim 1 wherein said hydrocarbon is a straight chain hydrocarbon having from about 12 to about 15 carbon atoms.

5. The method of claim 1 wherein said sulfoxidation initiator comprises ozone and wherein said hydrocarbon comprises primarily dodecane.

6. The method of claim 1 wherein said hydrocarbon comprises primarily dodecane, said sulfoxidation initiator is ozone, and the promoter is $HNO_3$, $NO_2$, $NO$, or $N_2O_3$.

References Cited

UNITED STATES PATENTS 3,260,741   7/1966   Mackinnon et al. ____ 260—513

DANIEL D. HORWITZ, Primary Examiner

U.S. Cl. X.R.

204—162; 260—503